Feb. 4, 1958    E. F. KLESSIG ET AL    2,822,124
GEAR TYPE FLUID PUMP WITH ADJUSTABLE GEAR SETS
Filed Feb. 7, 1956

INVENTORS
Ernst F. Klessig & Wynne A. Lilly
BY
Barnes, Kisselle, Laughlin, & Raisch
ATTORNEYS United States Patent Office 2,822,124
Patented Feb. 4, 1958

2,822,124

GEAR TYPE FLUID PUMP WITH ADJUSTABLE GEAR SETS

Ernst F. Klessig, Berkley, and Wynne R. Lilly, Dearborn, Mich., assignors to Allied Products Corporation, Detroit, Mich., a corporation of Michigan Application February 7, 1956, Serial No. 567,704

2 Claims. (Cl. 230—141)

This invention relates to fluid pumps or compressors particularly hydraulic pumps of the gear type. Heretofore, gear-type hydraulic pumps have been made and assembled by classifying the ring gears and the rotors according to size. It has been necessary to carefully measure both of these elements to ascertain to diameters and to select the ring gear and the rotor set from two that measure within a half a thousand tolerance either way from being a perfect match. This has resulted in considerable cost in classifying and matching the ring and rotor sets.

It is the object of my invention to eliminate the necessity of classifying the rotors and the ring gears so that they can be matched within the tolerance limits indicated above. To this end I propose to provide a rotor and stator adjustment which affords a perfect fit and perfect contact on the forward side of the rotor with the matching interior gear teeth of the ring. This is accomplished in a very simple way, namely, by providing one tight dowel pin and dowel hole fit and one dowel pin and one dowel hole loose fit.

Referring to the drawings.

Figure 1:
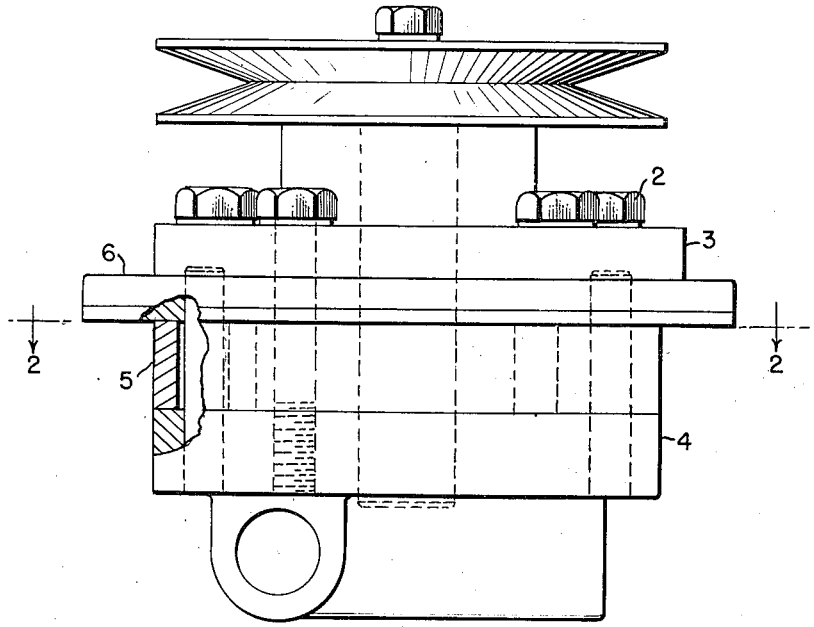
Fig. 1 is a top elevation of a gear type rotor pump with the view broken away adjacent the loose dowel pin.
Figure 2:
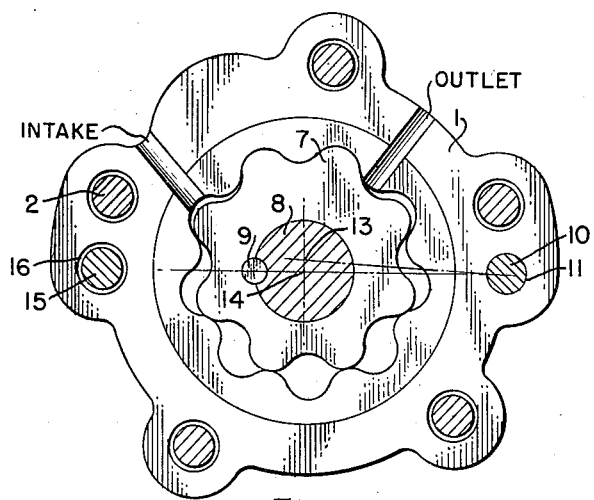
Fig. 2 is a section taken on line 2—2 of Fig. 1.

1 is the stator of the pump which consists of two flanged forgings 3 and 4 bolted together by the five bolts 2 with two rings 5 and 6 in between. The rotor 7 is secured to the shaft 8 by the key 9. A dowel pin 10 fits closely in a dowel pin hole 11. We call this a close fitting dowel pin and dowel hole, although the fit is not so tight that the elements cannot turn on this dowel pin when the bolts 2 are released. These bolts 2 fit into the bolt holes with considerable clearance, which allows the forgings to be turned one with respect to the other. The tight fitting dowel pin is on a radius whose center 13 is eccentric to the center 14 of the rotor shaft. The loose dowel pin 15, which has considerable clearance in the dowel pin hole 16, has its center at the center 14 of the rotor shaft.

We are aware that with vane type pumps dowel pins have been provided with considerable clearance to allow the castings to be shifted one with respect to the other to adjust the rotor to the stator. But this adjustment has been more or less a hit and miss finding operation to get the supposedly desirable location of one member with respect to the other. This is permissable with the vane type pump because the adjustment would not have to be strictly correct with vanes which yield with the springs that project them outwardly.

But in a gear type pump it is necessary to have the teeth of the ring gear and the rotor fit within very close limits or else the efficiency of the pump is badly impaired. For instance, if at the compression side of the pump chamber the teeth of the rotor and the ring gear do not come within two one thousandths separation the pump operation is practically nil for the fluid will escape between the teeth. In our dowel pin arrangement the two forgings and intervening rings may be set up, and when the bolts are loose the forging, which carries the rotor shaft, namely the rear forging 3, may be swung on the tight fitting dowel pin until the rotor teeth contact with the internal teeth of the ring gear and a true contact made between the epicloid teeth and gullets on the rotor and the hypicloid teeth and gullets on the ring gear. The teeth on the rotor are true epicloids, that is they are formed by a point on a small circle taking a curved path when the small circle is rolled on the external circumference of a larger circle. The hypicloid teeth and gullets on the internal gear are likewise formed by a point taking a curved path when a small circle is rolled on the inside of the circumference of a larger circle.

These teeth are accurately formed by being pressed out of powdered metal by dies under tremendous pressure and then the powdered product is heated to high temperature to cause the metal particles to coalesce to form accurate forgings that do not have to be machined. The rotors and the ring gears can be matched together and assembled without any machining. As stated in the preamble of the specification, this previously had to be done by classifying the rotors and ring gears in sets in which the tolerance one way or the other from a perfect match does not exceed one half a thousand. With my invention this does not have to be done. Any rotor can be assembled with any ring gear and then the forging with the rotor can be swung around on the tight dowel pin until the gear teeth contact with each other. There will be no clearance between the teeth at the forward side or at the pressure side of the compression chamber. Of course, this may result in some clearance at the rear side of the pressure chamber, but this will be of no material account.

We claim:

1. A fluid pump of the gear type which comprises a stator with parts including two flanged casings, bolts bolting the flanged casing members together, together with one or more intervening rings, the said casings having an intake and an exhaust, the said bolts having considerable clearance in the bolt holes, a ring gear fitting in one casing to turn, the said ring gear having internal teeth, a rotor and rotor shaft mounted in the other flanged casing and having external teeth to engage with the internal teeth of the ring gear, the ring gear and the stator being slightly eccentric to the axis of the shaft and the rotor, whereby when the rotor is rotated, the external and internal teeth will mesh and the ring gear will turn with the rotor, but the teeth and the gullets of the rotor and ring gear will fit together at one portion of the circle but will separate in a large part of the circle opening up to form a compression chamber and to suck fluid in through the intake, and then closing in upon the entrapped fluid to compress it and exhaust it, the two flanged stator elements including a dowel pin hole and a closely fitting dowel pin and at the diametrically opposite side a dowel pin hole and a dowel pin with a substantial clearance with respect to the hole, whereby when the bolts are loosened, the one casing element may be rotated with respect to the other accurately on the closely fitting dowel pin, and the other dowel pin and its clearance will permit this rotation to bring the gear teeth into substantial contact at the forward end of the pressure chamber.

2. The combination of claim 1 in which the gear teeth and gullets between the teeth are epicloids, and the internal gear teeth and the gullets between the teeth on the ring gear are hypicloids.

References Cited in the file of this patent

UNITED STATES PATENTS

| | | |
|---|---|---|
| 1,316,855 | Olson | Sept. 23, 1919 |
| 1,604,802 | Brenzinger | Oct. 26, 1926 |
| 1,819,689 | Ott | Aug. 18, 1931 |
| 2,490,115 | Clarke | Dec. 6, 1949 |
| 2,544,144 | Ellis | Mar. 6, 1951 |
| 2,622,529 | Parsons | Dec. 23, 1952 |
| 2,651,453 | Le Febvre et al. | Sept. 8, 1953 |
| 2,666,336 | Hill et al. | Jan. 19, 1954 |

FOREIGN PATENTS

| | | |
|---|---|---|
| 1,097,160 | France | Feb. 9, 1955 |